Aug. 27, 1957  E. E. SHELDON  2,804,560
ELECTRONIC DEVICE SENSITIVE TO INVISIBLE IMAGES
Filed June 1, 1951  2 Sheets-Sheet 1
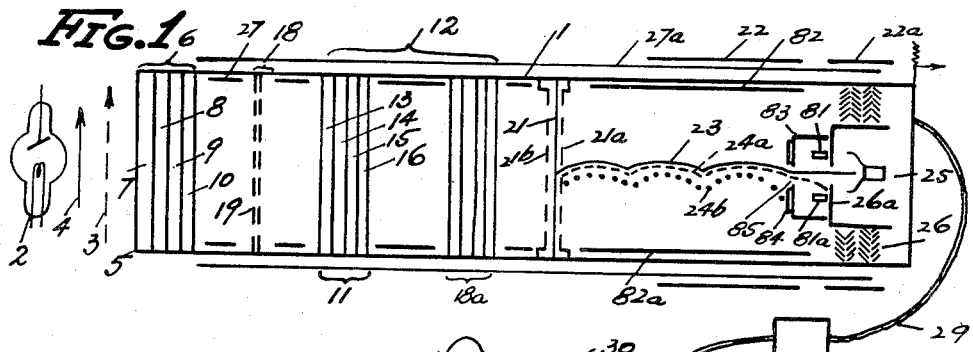
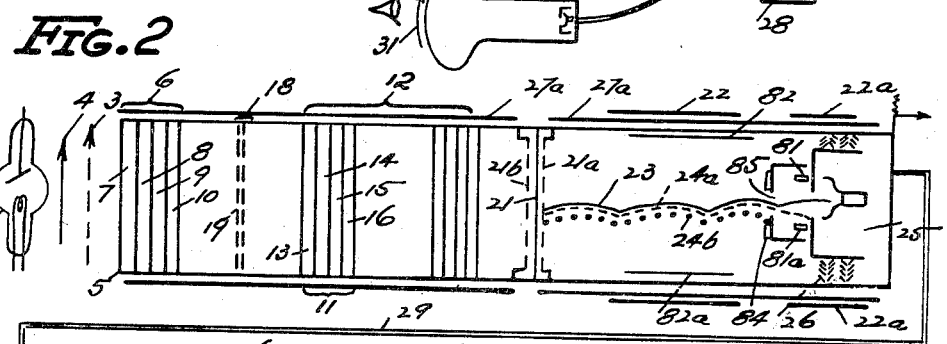
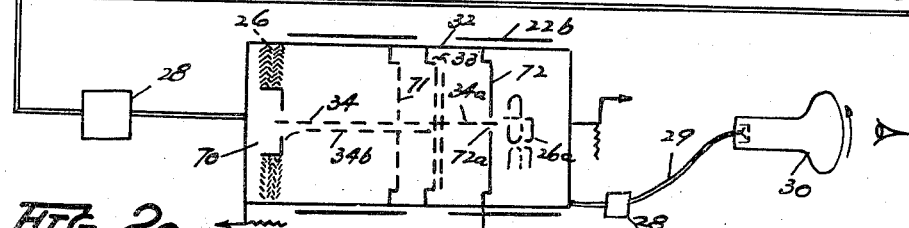
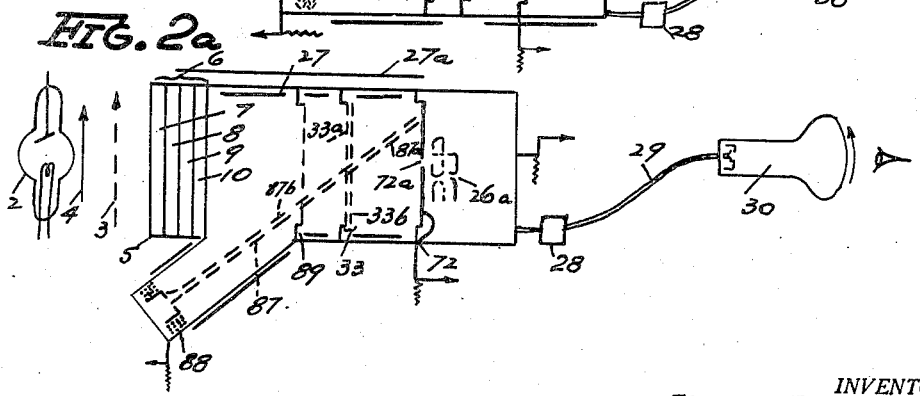
INVENTOR:
EDWARD EMANUEL SHELDON.
BY: *Julian J. Wittal,*
his ATTORNEY.

Aug. 27, 1957 E. E. SHELDON 2,804,560
ELECTRONIC DEVICE SENSITIVE TO INVISIBLE IMAGES
Filed June 1, 1951 2 Sheets-Sheet 2
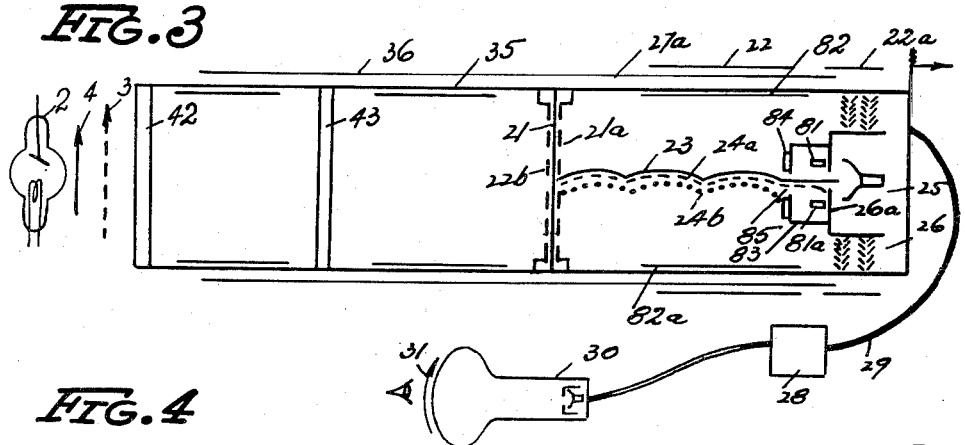
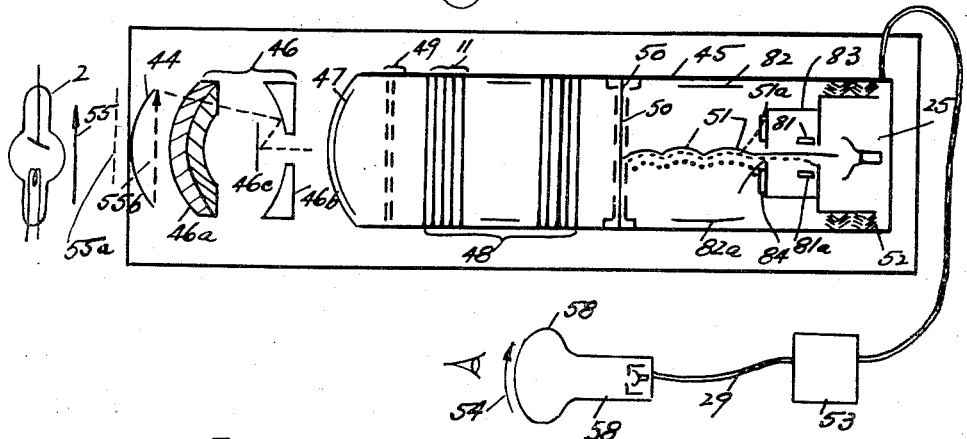
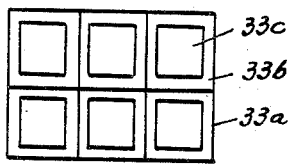
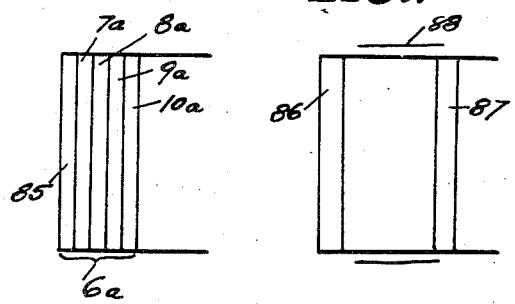
INVENTOR:
EDWARD EMANUEL SHELDON,
BY: Julian J. Wittal,
his ATTORNEY.

United States Patent Office 2,804,560
Patented Aug. 27, 1957

2,804,560

ELECTRONIC DEVICE SENSITIVE TO INVISIBLE IMAGES

Edward Emanuel Sheldon, New York, N. Y.

Application June 1, 1951, Serial No. 229,491

6 Claims. (Cl. 313—65)

This invention relates to an improved method and device of intensifying images and refers more particularly to an improved method and device for intensifying images formed by the X-ray radiation and by other invisible radiations, such as gamma rays and the like, and also by beams of atom particles, such as e. g., neutrons, and represents a continuation in part of my co-pending application, Serial No. 13,916, filed March 9, 1948, now Patent No. 2,555,424.

One primary object of this invention is to provide a method and device to produce intensified images. This intensification will enable to overcome the inefficiency of the present X-ray fluoroscopic examinations. At the present level of illumination of the fluoroscopic image, the human eye has to rely exclusively on scotopic (dark adaptation) vision, which is characterized by a tremendous loss of normal visual acuity in reference both to detail and to the contrast.

Another object of this invention is to make it possible to prolong the fluoroscopic examination, since it will reduce markedly the strength of radiation affecting the patient's body. Conversely, the exposure time or energy necessary for the radiography may be reduced.

Another object is to provide a method and device to produce sharper X-ray fluoroscopic and radiograhic images than was possible until now.

Another important object of this invention is to provide a method and device to amplify the contrast of the X-ray image.

The present intensifying devices concerned with reproduction of X-ray fluoroscopic images were completely unsatisfactory, as in the best of them, amplification of the original image brightness of the order of 3 to 5 was achieved, while, in order to obtain improvement in the visual acuity, intensification of the brightness of the order of 500–1000 is obligatory. Without intensification of luminosity of at least of the order of 500–1000, the eye is confined to so-called scotopic vision, at which it is not able to perceive definition and contrast of the fluoroscopic image. It is well known that intensification of the brightness of the X-ray fluoroscopic image cannot be achieved by increase of energy of the X-ray radiation, as it will result in damage to the patient's tissues. Therefore, to obtain the objects of this invention, a special X-ray sensitive pick-up tube had to be designed. This novel X-ray pick-up tube is characterized by elimination of the optical system, which resulted in 20–30 fold gain in the light reaching the photocathode. This gain of incident light on photocathode allowed to activate the television system, which before was not possible as with the amount of incident light available after passage through the focusing optical system, the signal to noise ratio was too low for satisfactory results.

To accomplish the objectives of this invention, a composite X-ray sensitive screen consisting of an extremely thin photoemissive layer and of X-ray fluorescent or reactive layer, is poistioned within a novel X-ray pick-up tube to function as a receiving photocathode for the invisible X-ray image. This combination represents a basic improvement, as it results in 20–30 fold gain in light reaching the photoemissive layer. The importance of this construction is clear, when it is considered that the most sensitive television pick-up tubes have a threshhold of operation at above 0.01 millilambert, at which level, the sharpness of produced image is unsatisfactory. It is obvious, therefore, that the elimination of the optical system disposed between the fluorescent screen and television pick-up tube represents an important improvement in securing the necessary amount of light for operation of the tube. Still better results were obtained by the use of a very thin light reflecting layer, such as for example, of aluminum deposited on the surface of the fluorescent layer of the composite screen, nearest the source of radiation, in order to increase the transfer of light to the photoemissive layer. In some cases, it is very important to interpose between the fluorescent and photoemissive layers a very thin light transparent, chemically inactive separating layer.

The signal to noise ratio controlling the sharpness and contrast of the image was further improved by the use of series of composite screen, each consisting of electron transparent light reflecting layer, electron fluorescent layer, chemically inactive light transparent layer and of photoemissive layer which screens are disposed in the novel X-ray pick-up tube in succeeding stages. The X-ray image is converted in the composite X-ray sensitive photocathode into photoelectron image. The photoelectron image is accelerated and focused by the electrical or magnetic field, on the next electron sensitive composite screen, whereby an intensified photoelectron image is produced, which again may be focused on the next electron sensitive composite screen, producing further intensification of image.

Additional gain in signal to noise can be obtained by increasing the output of light from the fluorescent layer of composite photocathode and screens. This was accomplished by covering the surface of the fluorescent layer with multiple cone-like or pyramid-like depressions. In this way, the emission of fluorescence was increased in the ratio equal to the relation between the surface of the cone and the surface of its base and is, therefore, many times larger than the fluorescence of an even fluorescent screen.

Further intensification of the X-ray image was obtained by the use of one or plural electron multipliers disposed between the composite X-ray sensitive photocathode described above and the target of the X-ray sensitive pick-up tube. The photoelectron image, having the pattern of the X-ray image emitted by the composite X-ray sensitive photocathode, is accelerated and focused by the electric or magnetic fields on the secondary electron-emissive electrode, whereby an intensified electron image is produced.

In some instances, it is advantageous to demagnify the electron image emitted by the first composite X-ray sensitive screen before projecting it on the next composite screen, or on the electron multiplier electrode. The electron diminution of the image results in its intensification proportional to the square power of linear decrease of its size.

Next, the intensified photoelectron image is stored in the target of the X-ray sensitive pick-up tube, for a predetermined period of time, then is scanned by electron beam and converted into video signals. Video signals are sent to amplifiers. By the use of variable mu amplifiers in one or two stages, intensification of video signals can be produced in non-linear manner, so that small differences in intensity of succeeding video signals can be increased one to ten times, producing thereby a corresponding gain of the contrast of the final visible image in receivers, which was one of the objectives of this invention.

In some cases, it may be necessary to include a special storage tube in the X-ray image intensifying system, in order to overcome the flicker resulting from long frame time. In such case, video signals are sent to the storage tube having photocathode of mosaic continuous or grid type and are deposited there by means of modulating the electron scanning beam of said storage tube. The stored electrical charges having the pattern of X-ray image are released from the photocathode after predetermined time by scanning it with another electron beam. The released electron image is converted again into video signals and sent to final receivers to produce visible image with desired intensification and gain in contrast and sharpness.

The invention will appear more clearly from the following detailed description, when taken in connection with the accompanying drawings by way of example only preferred embodiments of the inventive idea.

In the drawings:

Figure 1 is a cross-sectional view of the X-ray image intensifying system showing the X-ray sensitive pick-up tube;

Figure 2 is a cross-sectional view of the X-ray image intensifying system showing in addition an X-ray image storage tube;

Figure 2a is a sectional view showing a modification of the X-ray intensifying system;

Figure 3 is a sectional view of the front portion of the X-ray pick-up tube showing an alternate form of the X-ray pick-up tube;

Figure 4 is a cross-sectional view of an alternate form of the X-ray image intensifying system showing the optical system and the X-ray pick-up tube;

Figure 5 is a plan view of perforated target.

Figure 6 represents a front portion of the neutron-sensitive pick-up tube;

Figure 7 represents a modification of a front portion of the neutron-sensitive pick-up tube.

Reference now will be made to Fig. 1, which illustrates new X-ray sensitive pick-up tube 1 to accomplish the purposes of the invention, as outlined above. The X-ray source 2 produces invisible X-ray image 3 of the examined body 4. The invisible X-ray image 3 penetrates through the face 5 of the X-ray sensitive pick-up tube and activates the composite screen 6 acting as a photocathode and which consists of a very thin X-ray transparent light reflecting layer 7, such as e. g. of aluminum, or X-ray fluorescent layer 8, with powdered glass, of a very thin chemically inactive light transparent separating layer 9 and of photoemissive layer 10. The face 5 of the tube is of material transparent to radiation used for examination.

The fluorescent layer 8 and the photoemissive layer 10 should be correlated, so that under the influence of the particular radiation used, there is obtained a maximum photoemissive effect. More particularly the fluorescent layer should be of a material having its greatest sensitivity to the type of radiation to be used and the photoemissive material likewise should have its maximum sensitivity to the wave length emitted by the fluorescent layer. Fluorescent substances that may be used are: zinc silicates, zinc selenides, zinc sulphide, calcium tungstate or $BaPbSO_4$ with or without activators. The satisfactory photoemissive material will be caesium oxide, activated by silver, or caesium, potassium or lithium with antimony or bismuth. An extremely thin light transparent chemically inactive separating layer 9 should separate the fluorescent 8 and photoemissive 10 layers. The separating layer 9 can be an exceedingly thin light transparent film of mica, glass, silica, $ZnF_2$, of a conducting material, such as known in trade under name of "Nesa," or of a suitable plastic, and serves to prevent detrimental chemical reaction between fluorescent and photoemissive layers.

The X-ray image 3 is converted in the fluorescent layer 8 of the composite photocathode 6 into a fluorescent image and then in the photoemissive layer 10 into a photoelectron image. The photoelectron image, having the pattern of the X-ray image, is accelerated by electric fields 27 and is focused by means of magnetic or electrostatic fields 27a on the first composite screen 11 of the image amplifying section 12 of the tube. The amplifying section 12 has one or a few successively arranged composite screens 11, each of them consisting of electron pervious, light reflecting layer 13, of layer 14 fluorescing when irradiated by electrons, of a very thin chemically inactive separating layer 15 transparent to fluorescent light and of photoemissive layer 16. Fluorescent substances, which may be used for the composite screen, are zinc silicates, zinc selenides, zinc sulphide, calcium tungstate or $BaPbSO_4$, with or without additional activators. The satisfactory photoemissive materials are caesium oxide activated by silver, caesium with antimony or without bismuth or antimony with lithium or potassium. The separating layer 15 bebtween the fluorescent and photoemissive surfaces can be a very thin light transparent layer of mica, glass, $ZnF_2$, of silica, of a conducting material, such as known in trade under name "Nesa," or of a suitable plastic. The electron pervious light reflecting layer 13 may be of aluminum or of silver. The photoelectron image from the photocathode 6 focused on the composite screen 11 causes fluorescence of its fluorescent layer 14, which activates the photoemissive layer 16, producing an intensified photoelectron image having the pattern of the X-ray image. The intensified photoelectron image can be again focused on next composite screen 18a having the same construction as the above described screen 11, whereby its further intensification is achieved.

The fluorescent layer in the composite photocathode and in the composite screens may be pitted with multiple cone-like or pyramid-like depressions. In this way, the emission of fluorescence is increased in the ratio equal to the relation between the surface of the cone and the surface of the base of the cone and is, therefore, many times larger than the fluorescence of an even fluorescent screen.

In some instances, it is advantageous to demagnify the photoelectron image emitted by the composite photocathode 6 before projecting it on the composite screen 11 of the amplifying section 12. The electron diminution of the image is accomplished by means of electrostatic or magnetic fields, which are well known in the art and, therefore, are omitted, in order not to complicate drawings.

In some applications, it may be preferable to use, in conjunction with amplifying section 12, the electron multiplier section 18, consisting of one or few stages of secondary electron emitters 19, which serves to intensify further the electron image. In such a case, the electron image from the composite photocathode, is focused by means of electrostatic or magnetic fields on the first stage 19 of the multiplier section. This results in intensification of the electron image by secondary emission.

The secondary electrons emitted from the first stage and having the pattern of the X-ray image, may be focused after acceleration on the second stage of the multiplier section, producing thereby further intensification of the electron image. The electron image, produced by electron multiplier section of the tube, is projected on the first composite screen 11 of the amplifying section 12 of the pick-up tube for further intensification. The electron image produced by the amplifying section of the tube is accelerated and focused on the two-sided semiconducting target 21, such as of glass, precipitated silica or MgO and causes a secondary electron emission from said target, producing therein pattern of electrical charges corresponding to the X-ray image. The secondary electrons are led away by adjacent mesh screen 21b. The electron image can be stored in the target for a predetermined time by choosing proper resistivity and conductivity of target material. The target 21 is scanned by electron beam 23 from the electron gun 25.

The scanning electron beam is given helical motion, which means an additional transverse velocity. This is accomplished by the use of two electrodes 81 and 81a disposed on both sides of the scanning beam 23. The electrodes 81 and 81a are provided with a positive potential from an extraneous source of electrical energy. The helical motion may be also produced in other ways, such as, for example, by mis-alignment of the electron gun 25 in relation to the axial focusing field. The scanning electron beam is decelerated in front of the target 21 by means of ring electrode or preferably by using a mesh screen 21a. The scanning electron beam is modulated by the pattern of the electrical charges on the target. The returning electron beam 24 consists of two different groups of electrons. One of them 24b is made of electrons reflected by the target 21, whereas the other group 24a is formed by scattered electrons. The reflected electrons correspond to dark areas of the picture. The scattered electrons correspond to the light areas of the picture because the light areas produce positive charges on the target, as was explained above. The returning electron beam 24, consisting of these two different groups of electrons is deflected from the original path of the scanning beam 23 by electrodes 82 and 82a. The anodes 82 and 82a may be planar or curved and do not have to be described in detail, as they are well known in the art.

In front of the electron gun 23, there is disposed cylindrical electrode 83, which pulls the secondary electrons from the first multiplying dynode 26a into the multiplier 26. A disc 84 is connected with the electrode 83 or forms a part of it. The disc 84 has an opening 85, which may be a circular or rectangular shape. The electrodes 82 and 82a cause displacement of the returning electron beam downwards. As was explained above, the scattered electrons 24a, having larger transverse velocity than the reflected electrons, are outside of the beam of the reflected electrons 24b. Therefore, by depressing the returning electron beam 24 by electrodes 82 and 82a, the reflected electrons may be directed against the disc 84 below its aperture 85 and will be eliminated, whereas the scattered electrons will be admitted into aperture 85. In this way, both groups of electrons may be separated from each other. The scattered electrons, after passing through the aperture 85, strike the first dynode 26a of the multiplier 26. The secondary electrons are drawn by the action of the electrode 83 to the next stage of the multiplier, which is around and in the back of the first stage. This process is repeated in a few stages, resulting in a marked multiplication of the original electron signals. The signal currents from the last stage of the multiplier are converted over a suitable resistor into video signals. The strongest video signals will correspond to the highlights of the picture, because the strongest scattering of electrons takes place at the most positively charged areas of the target 21. Video signals are fed into the television amplifiers 28 and then are sent by coaxial cable 29 or by high frequency waves to the receivers of kinescope type 30 or facsimile, in which they are reconverted into visible images 31 for recording.

In front of the target 21, there is disposed a mesh screen 21a, which provides a uniform electrical field necessary for good resolution of the picture. In another modification of this system, the helical motion of the scanning electron beam 23 is obtained by the use of alignment coil 22a, which produces necessary electrical cross field. If the cross field is strong enough, the electrons of the scanning beam will have the required transverse velocity. At the same time, the whole scanning beam will be deflected downward or upward from the axis of the tube. In the returning electron beam 24, the reflected electrons 24b are deflected more downward than the scattered electron 24a. In this way, the scattered electrons will be admitted into the opening 85 in the disc-electrode 84 and will be converted, after multiplication, into video signals. On the other hand, the reflected electrons will strike the disc-electrode below its opening and will be eliminated. Further improvement of operation may be obtained by having two openings in the disc-electrode 83; one for outgoing scanning electron beam 23 and another one for admission of scattered electrons 24a. In such a case, multipliers are disposed on one side of the electron gun and the electron gun is disposed above the axis of the tube.

The focusing fields 27a, deflecting fields 22 and synchronizing circuits are not indicated in detail, because they are well known in the art, and would only complicate the drawings.

In order to obtain amplification of contrast of the X-ray image, the amplifiers 28 are provided with variable tubes in one or two stages. Small differences in intensity of the succeeding video signals are increased by variable mu tubes in non-linear manner, resulting in a gain of the contrast of the visible image in receivers. The synchronizing and deflecting circuits 22 are not shown in detail as they are well known in the art and would complicate the drawings.

An improvement in operation of the X-ray image intensifying system was obtained by use of a special storage tube for video signals, see Figure 2. By the use of storage tube, the scanning time in the X-ray pick-up tube can be prolonged, as well as the frame time, resulting in a proportionately greater electron output of the composite photocathode. The flicker caused by prolongation of frame time can be in this way successfully eliminated. The X-ray image in the form of the video signals is sent from the X-ray pick-up tube 1 or 35 to the storage tube 32 and is deposited there in the form of electric charges, by means of modulating the scanning electron beam 34 of said storage tube, in a special target 33, in which it can be stored for a predetermined time.

The storage target 33 is shown in Figure 5 and consists of a thin, perforated sheet of metal or other conducting material, or of a woven conducting wire mesh 33a. On the side of the target opposite to the electron gun there is deposited by evaporation storage material 33b in such a manner that openings 33c in the target should not be occluded.

In some cases on the side of the target facing the lectron gun, there is deposited by evaporation, a thin metal coating to prevent leakage of charges. The scanning electron beam 34 is produced in the storage tube 32 by the electron gun 70 and is modulated by incoming video signals from the X-ray pick-up tube 1. The scanning electron beam may be focused and deflected to produce television-like raster by magnetic or electrostatic means which are well known in the art. This scanning electron beam should have the finest spot compatible with the required intensity of beam. Between the electron gun and the storage in a close spacing to the target, there is mounted a fine mesh conducting screen 71. On the opposite side of the storage target there is disposed a metal electrode 72, which acts as an electron mirror during the writing phase of operation and attracts the electrons during the reading phase.

The scanning beam is decelerated between the screen 71 and the target 33. Then it passes through the openings 33c in the target 33. The electrode 72 during writing, is kept at the potential negative in relation to the cathode of the electron gun 70. Therefore, the electrons of the scanning beam are repelled by it, fall back on the storage target 33 and deposit thereon varying charges at successive points according to the amplitude of modulating input signals from the X-ray pick-up tube. The best way of operating my system is to have the storage surface at zero potential or at cathode potential and then to write on it positive, which means to deposit positive charges.

This can be accomplished by adjusting the potential of the surface of the storage target, so that its secondary emission is greater than unity. The secondary electrons are led away and positive charges are left on the storage surface. These positive charges deposited on the storing surface of the target may be stored thereon for many hours depending on the type of the storage material $33b$ which was used, whereas, $BaF_2$ has a time constant of 0.1 second, $CaF_2$ has the time constant of 50 hours.

The video signals corresponding to X-ray image may be stored in the form of a charge image also on the side of the storage target facing the electron gun. In such a case, the storage surface of the target should face the electron gun and reflector 72 does not operate during the writing phase. When the stored image is to be read, the potential of the electron reflector 72 is made more positive than the potential of the storage screen mesh $33a$, so that it will act now as a collector of electrons. Therefore, the scanning electron beam 34, after passing through the perforations $33c$ in the target 33, will land on the collector 72.

The passage of the scanning electron beam is modulated by the pattern of the deposited charges on the storage charges. The greater the positive charge, the more electrons will pass through openings in the target; the less positive the stored charge, the fewer electrons will be transmitted. The transmitted electrons of the scanning beam are collected by electrode 72 and are converted over a suitable resistor into video signals.

Video signals may be intensified by the use of multipliers. In such a case, electrons of the scanning beam 34, which are transmitted through the target 33, are made to pass through an aperture $72a$ in the electrode 72 disposed between the storage target 33 and the end wall of the tube. By applying suitable deflection fields $22b$, in two planes perpendicular to each other, to the transmitted electrons, they are made to pass through the aperture $72a$ in the electrode 72 in succession corresponding to various image points.

The electrons which pass through the aperture are fed into the multi-stage multiplier $26a$ for intensification. The electrons emerging from the multiplier are converted over a suitable resistor into video signals in a manner well known in television. Video signals are sent to receivers by coaxial cable or by high frequency waves to reproduce a visible image.

The reading of the stored X-ray image in the storage tube 32 may be also accomplished by using for producing video signals, the electrons $34b$ of the scanning beam returning from the target instead of electrons $34a$ transmitted through the target. The scanning electron beam 34 partly passes through the perforations of the target 33, and partly returns back to the electron gun. These returning electrons $34b$ may be directed to the electron multiplier 26, disposed in successive stages. The returning electrons are obviously modulated by the stored charge image in the target and, therefore, carry the same video information as the transmitted electrons, only of reversed polarity. In this way, the electrons carrying video information may be multiplied and produce much stronger video signals than it was possible without the use of the multipliers.

The returning electron beam $34b$ contains two groups of electrons. One group is electrons which were reflected specularly from the target; another is electrons which were reflected non-specularly, which means they were scattered. These two groups can be separated from each other before reaching the multiplier. There are many ways to separate these two groups of electrons, all well known in the art. The best method is to introduce an additional helical motion into a primary scanning beam, as was explained above. Then the scattered electrons in the returning beam will be on one side of the specularly reflected electrons. Therefore, it will be possible to direct scattered electrons into the aperture of the multiplier, while stopping the reflected electrons by the edge of the multiplier aperture, or of an additional electrode aperture, as was explained above. The use of scattered electrons increases markedly sensitivity of the system, because it reduces the inherent shot noise of the scanning electron beam.

A simplified solution of the intensification and storage of X-ray images is realized in the system using an X-ray pick-up storage tube, shown in Fig. $2a$. In this modification of my invention, the invisible X-ray image of the examined object is converted by the composite photocathode 6, which has been described above, into a photoelectron image. The photoelectron image is accelerated by the electrode 27 and is focused by the magnetic or electrostatic fields $27a$ on the perforated storage target 33 of the same type as the one described above, and shown in Fig. 5. The photoelectrons, after passage through openings in the target, are reflected back by the metallic reflector electrode 72, because in this phase of operation, its potential is lower than that of storage target. The impingement of photoelectron beam causes secondary electron emission from the target 33 greater than unity. The secondary electrons are drawn away by the mesh screen $33a$ of the storage target, which is connected to the source of the positive potential or by a collecting electrode. As a result a positive charge image is formed on the perforated target 33 having the pattern of the original X-ray image. This charge image can be stored in the target as long as 50 hours. The photoelectron image may be also stored in the form of a positive charge image on the side of the storage target facing the photocathode 6. In such a case the storage surface of the target should face the photocathode and reflector 72 is not operating during the writing phase.

In the reading phase of operation of my system the target 33 is scanned by a slow electron beam 87 from electron gun 88. The electron beam is focused by magnetic or electrostatic fields and is decelerated by the electrode 89. The focusing and deflecting fields and synchronizing circuits are not shown in order not to complicate the drawings. It is obvious that all fields controlling the scanning electron beam 6 are inoperative during the writing phase of the operation. In the same way the fields controlling the photoelectron beam are not operating during the reading phase of the operation.

When the stored image is to be read the potential of the electrode 72 is made more positive than the potential of the storage screen mesh $33a$, so that it will now attract electrons. Therefore the scanning electron beam 87 which passes through the perforations in the target 33, will go to electrode 72. The passage of the scanning electron beam is modulated by the pattern of deposited charges on the storage target. The greater is the positive charge the more electrons will pass through the openings in the target. The less positive is the stored charge, the fewer electrons will be transmitted through these openings. In this way the electron beam 87 scanning the storage target in the usual television raster will be modulated by the stored image. The transmitted electrons $87a$ will be drawn towards the electrode 72, will be fed into multiplier $26a$ successively through aperture $72a$ in the electrode 72 and will be converted over suitable resistor into video signals. Also, the returning electrons $87b$ may be used for this purpose, as was explained above in detail. Video signals, having the pattern of the original X-ray image, are now amplified and transmitted by coaxial cable or by high frequency waves to the receivers. Receivers may be of various type, such as kinescopes, facsimile receivers; electrographic cameras or various others may be used to reproduce images for inspection or of recording.

After the stored image has been read and no further storage is desired, it may be erased by the use of the scanning electron beam 87 by adjusting the potential of the storage target to the value at which the secondary electron emission of its storing surface is below unity, or by adjusting the velocity of electron beam 87. In such a case, the target will charge negatively to the potential of the electron gun cathode. The potential of the electrode 72 in the erasing phase of operation must be more negative than that of the storage target, so that the scanning electron beam will be repelled to the target.

In another modification of my invention, the storage of X-ray images may be accomplished by using in the X-ray pick-up tube 1, a target similar to target 21, but characterized by a large capacity. Such target can be made of a glass of a high resistance, such as $10^{15}$ ohm-cm. or of precipitated silica. This target, because of its high resistance, can store a large postive charge. Therefore, the scanning electron beam 23 will not discharge it in one scansion. By proper adjustment of the strength of the scanning beam 23, the stored charged image may be read many times before it is neutralized. It is obvious that X-ray radiation may be shut off during the reading of the stored image, which results in a marked saving of the X-ray exposure.

Another form of this invention shown in Figure 3 is characterized by the use in the X-ray sensitive pick-up tube 35 of a photocathode 42, consisting of an X-ray reactive layer of electron-emitting type 42, such as of lead or bismuth. The electrons liberated by X-ray radiation from the X-ray reactive layer are accelerated and projected on the secondary electron emissive screen 43, such as of Mg, Be, or tantalum. The secondary electron image from said screen 43 is focused on the two-sided target 21, by means of magnetic or electrostatic fields 36, as described above, and is stored therein in the form of a charge image.

The target may consist of a thin dielectric layer, such as glass. In such case, in close proximity to the target, there is a metallic mesh screen 21b, which collects secondary electron from the target. The target 21 is scanned by electron beam 23 from the electron gun 25. The scanning electron beam is given helical motion. The scanning electron beam is decelerated in front of the target 21 by means of a ring electrode, or preferably by using a mesh screen 21a. The X-ray image is stored in the target 21 as a charge image, in the same manner as was explained above describing the operation of the X-ray pick-up tube 1. The scanning electron beam 23 is, therefore, modulated by the pattern of the electrical charges on the target 21. The returning electron beam 24 is, therefore, also modulated by said stored charge image. The returning electron beam 24, as was explained above, consists of two different groups of electrons. One of them 24b, is made of electrons reflected by the target 21, whereas the other group 24a is formed by scattered electrons. The returning electron beam 24, consisting of these two different groups of electrons, is deflected from the original path of the scanning beam 23 by electrodes 82 and 82a. As was explained above, the scattered electrons 24a, having larger transverse velocity than the reflected electrons, are outside of the beam of the reflected electrons 24b. Therefore, by depressing the returning electron beam 24 by electrodes 82 and 82a, the reflected electrons may be directed against the disc 84 below its aperture 85 and will be eliminated, whereas the scattered electrons will be admitted into aperture 85. In this way, both groups of electrons may be separated from each other. The scattered electrons, after passing through the aperture 85, strike the first dynode 26a of the multiplier 26. The second electrons are drawn by the action of the electrode 83 to the next stage of the multiplier, which is around and in the back of the first stage. This process is repeated in a few stages resulting in a marked multiplication of the original electron signals. The signal currents from the last stage of the multiplier are converted over a suitable resistor into video signals. The strongest video signals will correspond to the highlights of the picture because the strongest scattering of electrons takes place at the most positively charged areas of the target 21. Video signals are fed into the television amplifiers 28 and then are sent by coaxial cable or by high frequency waves to the receivers of kinescope type 30 or facsimile, in which they are reconverted into visible images 31 for inspection or recording.

In another modification of this invention, see Fig. 4, the X-ray image 55a of the examined body 55, is converted into a visible fluorescent image 55b in the fluorescent screen 44, positioned outside of the X-ray pick-up tube 45, and is projected by the optical system 46 onto photo-cathode 47 of the X-ray pick-up tube 45. As explained above, the loss of light caused by the use of the optical system makes it impossible to activate the most sensitive television pick-up tube with the X-ray fluorescent image of the human body. Using the reflective optical system, there is obtained 5 to 8 fold gain in light reaching the photocathode of the pick-up tube from the fluorescent screen. This gain, being still not sufficient to activate the television pick-up tube, a novel pick-up tube was designed. The novel pick-up tube 45 is characterized by the amplifying section 48, consisting of single or plural composite screens and of electron multiplier section 49, which both were described in detail above. The X-ray fluorescent image is projected by the reflective optical system 46, which in this particular case, consists of meniscus lens 46a, of a spherical concave mirror 46b and of auxiliary plane or convex spherical mirror 46c, but may have different forms, also, well known to those skilled in the art, onto photocathode 47 to be converted there into photoelectron image. The photoelectron image, after multiplication in the multiplier section 49, and after intensification in the amplifying section 48 of the novel pick-up tube, is focused by means of magnetic or electrostatic fields on the target 50, where it is further intensified by secondary emission and stored. The target is scanned by electron beam 51. The latter is modulated by the electron pattern in the target corresponding to the X-ray image, so that non-specularly reflected, that is, scattered fraction of the returning electron beam 51a brings the signals to the multiplier 52, as was explained above. The electron signals, after intensification by the multi-stage multiplier 52, are sent in the form of video signals to the amplifier system 53 and therefrom to the immediate 58 or remote receivers to produce visible image 54 with desired luminosity and gain in contrast.

It is not intended to restrict the scope of this invention to the use of X-ray or gamma rays, but other corpuscular radiation, such as protons or neutrons, and suitable reactive layers should be comprehended. This form of the invention is illustrated in Figure 6. A neutron reactive layer 85 preferably such as boron, lithium, gadolinium, uranium, plutonium or paraffine is placed within the image tube to act as the neutron sensitive layer of the composite photocathode 6a. The protons or electrons liberated from the layer 85 under the impact of neutron radiation, will strike through a thin electron pervious chemically inactive, light reflecting barrier layer 7a, a suitable fluorescent layer 8a causing it to fluoresce and activate a suitable photoemissive layer 10a through the light transparent barrier layer 9a. In other cases, a neutron reactive layer of cadmium, indium or copper will be more advantageous because of gamma emission, which will cause fluorescence of the fluorescenct layer.

In some cases, it may be more desirable to eliminate the fluorescent layer and to cause protons or electrons from the neutron reactive layer 86 to act on adjacent electroemissive layer 87, such as of beryllium, magnesium or silver. In some cases, an electron pervious chemically inactive barrier layer may be used to prevent chemical interaction of said adjacent layers. In other cases, better results are achieved by focusing protons or electrons from the neutron reactive layer on the eletron emissive layer 87 with magnetic or electrostatic fields 8, see Figure 7.

Although particular embodiments and forms of this invention have been illustrated, it is understood that modifications may be made by those skilled in the art without departing from the true scope and spirit of the foregoing disclosure.

What I claim is:

1. A vacuum tube comprising in combination a light reactive photocathode comprising a light reactive photoemissive layer for receiving an image and converting said image into a photoelectron image and a composite screen for receiving said photoelectron image, said screen comprising in that order a light opaque layer pervious to said photoelectron image, a luminescent layer, a light transparent separating layer, also transparent to ultraviolet radiation, and a photoemissive layer having a continuous and exposed surface, said photoemissive layer furthermore being in contact with said light transparent separating layer.

2. A vacuum tube comprising in combination a light reactive photocathode comprising a light reactive photoemissive layer for receiving an image and converting said image into a photoelectron image, a composite screen for receiving said photoelectron image said screen comprising in that order a light opaque layer pervious to said photoelectron image, a luminescent layer, a light transparent separating layer, also transparent to ultraviolet radiation, and a photoemissive layer having an exposed surface, said photoemissive layer furthermore being in contact with said light transparent separating layer and comprising an element of the group consisting of antimony and bismuth, and means for converting said received photoelectron image into video signals.

3. A vacuum tube comprising in combination a light reactive photocathode comprising a light reactive photoemissive layer for receiving an image and converting said image into a photoelectron image, and a composite screen for receiving said photoelectron image, said screen comprising in that order a light opaque layer pervious to said photoelectron image, a luminescent layer, light transparent electrically conducting means and a photoemissive layer having a continuous surface, said photoemissive layer being in contact with said light transparent conducting means and comprising an element of the group consisting of antimony and bismuth.

4. A vacuum tube comprising in combination a light reactive photocathode comprising a light reactive photoemissive layer for receiving an image and converting said image into a photoelectron image, a composite screen for receiving said photoelectron image, said screen comprising in that order a light opaque layer pervious to said photoelectron image, a luminescent layer, a light transparent, electrically conducting separating layer, a photoemissive layer having an exposed surface, said photoemissive layer furthermore being in contact with said transparent conducting layer, and means for converting said received photoelectron image into video signals.

5. A vacuum tube comprising in combination a light reactive photocathode comprising a light reactive photoemissive layer for receiving an image and converting said image into a photoelectron image, and a composite screen for receiving said photoelectron image, said screen comprising in that order a light opaque layer pervious to said photoelectron image, a luminescent layer, a light transparent separating layer, transparent also to ultraviolet radiation, and a photoemissive layer having a continuous and exposed surface, said photoemissive layer further comprising an element of the group consisting of antimony and bismuth and being in contact with said light transparent layer.

6. A vacuum tube comprising in combination a light reactive photocathode comprising a light reactive photoemissive layer for receiving an image and converting said image into a photoelectron image, a composite screen for receiving said photoelectron image, said screen comprising in that order a light opaque layer pervious to said photoelectron image, a luminescent layer emitting ultra-violet radiation, a light transparent separating layer, transparent also to ultra-violet radiation, and a photoemissive layer having a continuous and exposed surface, said photoemissive layer furthermore being in contact with said light transparent layer and means for converting said received photoelectron image into video signals.

References Cited in the file of this patent

UNITED STATES PATENTS

| Number | Name | Date |
| --- | --- | --- |
| 2,270,373 | Kallmann et al. | Jan. 20, 1942 |
| 2,344,043 | Kallmann et al. | Mar. 14, 1944 |
| 2,541,374 | Morton | Feb. 13, 1951 |
| 2,545,982 | Weimer | Mar. 20, 1951 |
| 2,549,072 | Epstein | Apr. 17, 1951 |
| 2,555,423 | Sheldon | June 5, 1951 |
| 2,555,424 | Sheldon | June 5, 1951 |
| 2,579,351 | Weimer | Dec. 18, 1951 |
| 2,681,868 | Mason et al. | June 22, 1954 |